United States Patent [19]

Wessels

[11] 3,767,849

[45] Oct. 23, 1973

[54] ARRANGEMENT FOR PLAYING-BACK VIDEO SIGNALS

[75] Inventor: Johannes Hendrik Wessels, Emmasingel, Eindhoven, Netherlands

[73] Assignee: U.S. Philips Corporation, New York, N.Y.

[22] Filed: Nov. 22, 1971

[21] Appl. No.: 201,220

Related U.S. Application Data

[63] Continuation of Ser. No. 847,137, Aug. 4, 1969, abandoned.

[30] Foreign Application Priority Data

Aug. 9, 1968 Netherlands .................... 6811420

[52] U.S. Cl...... 178/6.6 DC, 178/6.6 A, 178/6.6 TC

[51] Int. Cl. ......................... H02n 5/21, H04n 5/78

[58] Field of Search .................. 178/6.6 A, 6.6 DC, 178/6.6 TC, 5.4 CD

[56] References Cited

UNITED STATES PATENTS 3,573,359 4/1971 Guisinger .................... 178/6.6 DC

*Primary Examiner*—James W. Moffitt
*Attorney*—Frank R. Trifari

[57] ABSTRACT

A device compensating for fluttering effects due to elongation variation by measuring phase shift at the end of a track change in a helical recording video system. During the track change the output of the control circuit is connected to a first input of a comparison circuit, a second input of which is connected to an output of the auxiliary generator which is designed as a sawtooth generator, the output of the comparison circuit being connected to a pulse generator which produces the missing line-synchronizing pulses in a manner such that these pulses are at least substantially in phase with the line synchronizing pulses of the next track. In the comparison circuit the direct voltage of the control circuit is compared with the amplitude of the sawtooth voltage, and when the two voltages are equal the pulse source produces a line synchronizing pulse which is at least substantially in phase with the line synchronizing pulses of the next track.

4 Claims, 3 Drawing Figures

PATENTED OCT 23 1973 3,767,849

INVENTOR.
JOHANNES H. WESSELS
BY
Frank R. Trifari
AGENT

ARRANGEMENT FOR PLAYING-BACK VIDEO SIGNALS

This is a continuation, of application Ser. No. 847,137, filed 8/4/69 and now abandoned.

The invention relates to an arrangement for playing-back video signals which have been recorded on a tape-shaped record carrier in transverse tracks, which record carrier is helically wound on a drum in a slot of which extending at right angles to the axis at least one playback member rotates which scans the video signals, whilst during the track changes the missing line synchronizing pulses are supplemented by an auxiliary generator.

When in reading, the length of the tape-shaped record carrier around the drum, owing to elongation or contraction or to a discrepancy in the drum diameter, is not exactly equal to the length during writing relative to the drum periphery, scanning the beginning of a now track will result in an abrupt variation in the regularity of the line synchronizing pulses read.

The flywheel line oscillator of the playback apparatus or receiver is not capable of dealing with this abrupt variation and consequently the upper portion of the picture displayed on the receiver will be slightly warped. The degree of warping varies with the elongation of the tape-shaped record carrier, which effect is referred to as "fluttering" and in normal receivers is restricted to the upper 5 or 10 per cent of the picture, dpending upon the time constant of the flywheel.

If the time of transition from one track to the other were infinitely small and the change of track were effected immediately on termination of a frame, the flutter would almost entirely take place during the frame flyback time and hence would be invisible, but this is not possible in practice.

According to the invention, the said disadvantage is avoided by the provision of a phase comparison circuit for measuring the abrupt phase shift between the supplemented pulses and the first pulse of the next track. The output of the phase comparison circuit is connected to the input of a control circuit in which the input voltage is converted into a control voltage which is stored in a sotre and during the next track change so influences the auxilliary generator that the abrupt phase shift at the end of the track change is at least substantially zero. This ensures that the line synchronizing pulses which are supplemented during the change of track register with the line synchronizing pulses of the next track, and the sudden variation in the regularity of the line synchronizing pulses takes place at the beginning of the track change.

Since the fluttering due to elongation variations is a slowly proceeding phenomenon, the sudden phase shift at the end of a track change can be used for compensating this shift at the next track change, since naturally this also proceeds slowly.

In an embodment of an arrangement according to the invention, during the track change the output of the control circuit is connected to a first input of a comparison circuit, a second input of which is connected to an output of the auxiliary generator which is designed as a sawtooth generator, the output of the comparison circuit being connected to a pulse generator which produces the missing line-synchronizing pulses in a manner such that these pulses are at least substantially in phase with the line synchronizing pulses of the next track.

In the comparison circuit the direct voltage of the control circuit is compared with the amplitude of the sawtooth voltage, and when the two voltages are equal the pulse source produces a line synchronizing pulse which is at least substantially in phase with the line synchronizing pulses of the next track.

In a further embodiment of the invention, an output of the sawtooth generator is connected to a first input of the phase comparison circuit, in which the sawtooth voltage as it is at the instants of occurrence of the line synchronizing pulses of the record carrier, which are continously applied to a second input of the phase comparison circuit, is measured and stored. An ouput of the phase comparison circuit is connected firstly to a filter in which the phase comparison voltage is smoothed and from the output of which it is fed back to the sawtooth generator for adapting the frequency of this generator to that of the line synchronizing pulses of the record carrier. The output of the phase comparison circuit is secondly to a first input of a clamping circuit to a second input of which the line synchronizing pulse at the beginning of a track is applied and which clamps the phase comparison voltage, and thirdly to a first input of a switch to a second input of which the output voltage of the clamping circuit is applied and which during the track change is changed over from the phase comparison circuit to the clamping circuit by a pulse and the output of which is connected to the first input of the comparison circuit.

Thus, the sawtooth oscillator is always maintained at a frequency equal to that of the line synchronizing pulses of the record carrier, and it is ensured that the pulses produced by the pulse generator, which generator is controlled by a voltage obtained at the output of the comparison circuit comparing the amplitude of the sawtooth in the comparison circuit with the amplitude of the phase comparison voltage, are always in phase with the line synchronizing pulses of the record carrier, until at the beginning of the track change a change-over takes place to the phase comparison voltage at the end of the preceding track change, the phase of the pulses from the pulse generator being varied by an amount which is substantially equal to the rapid phase variation between the supplemented pulse and the first line synchronizing pulse of the preceding track, while the frequency of the pulses from the pulse generator remains the same. The pulses from the pulse generator thus form a complete line synchronizing signal without interruptions which is applied to the display circuit instead of the line synchronizing signal of the record carrier.

When the sudden phase shift is too large, a normal flywheel oscillator of a display circuit cannot deal with it quickly enough even in the manner described. This disadvantage does not occur in another embodiment of an arrangement according to the invention, in which the line oscillator of the display circuit is used as the auxiliary oscillator, which line oscillator is connected to the output of the control circuit during the track change, the control voltage influencing the frequency of the line oscillator in a manner such that at the end of the track change the line synchronizing pulses are at least substantially in phase with the line synchronizing pulses of the next track.

The maximum phase change may be equal to a radians, corresponding to 32 microseconds. When the tuning of the ine oscillator can be varied by 625 Hz both in the positive and in the negative sense the line period can be increased or decreased by 2.56 microseconds, so that an error of $\pi$ radians can be eliminated in about 13 line periods, i.e., amply within the frame flyback time.

Features and advantages of the invention will appear from the following description of embodiments thereof, given by way of example only, with reference to the accompanying drawings, in which FIG. 1 is the circuit diagram of an arrangement into which a sudden phase shift is introduced at the end of a track;

Figure 1:
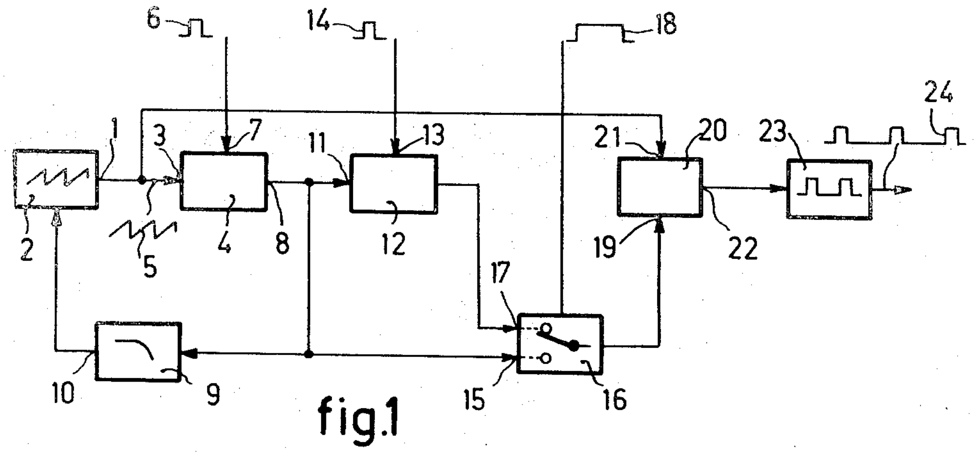

Referring to FIG. 1, there is shown a sawtooth generator 2 an output 1 of which is connected to a first input 3 of a phase comparison circuit 4 in which the value of the sawtooth voltage 5 during the line synchronizing pulses 6 of the record carrier, which are continuously applied to a second input 7 of the phase comparison circuit 4, is measured and clamped. An output 8 of the phase comparison circuit 4 is connected to a filter 9 in which the phase comparison voltage is smoothed, the smoothed voltage being fed back through an output 10 to the sawtooth generator 2, so that the frequency of the sawtooth generator 2 is made equal to the frequency of the line synchronizing pulses 6 of the record carrier. The output 8 of the phase comparison circuit 4 is also connected to the first input 11 of a clamping circuit 12, to a second input 13 of which the line synchronizing pulse 14 is applied at the beginning of a track, this clamping circuit 12 clamping the phase comparison voltage during the occurrence of the line synchronizing pulse 14, until the pulse at the beginning of the next track appears. The phase comparison voltage is also applied to a first input 15 of a switch 16, to a second input 17 of which is applied the output voltage of the clamping circuit 12, the switch 16 being switched over from the clamping circuit 12 to the phase comparison circuit 4 during the track change by a pulse 18 having a width equal to the duration of the track change, while the output of the switch 16 is connected to a first input 19 of a comparison circuit 20. Both the pulse 18 shown in FIG. 1 and the pulse 48 shown in FIG. 2 may be derived from the frame flyback pulse of the receiver or from a pulse provided in a magnetic track which is provided on the shaft of a disc connected to the scanning head. In this comparison circuit 20, the voltage at the first input 19 is compared with the sawtooth voltage 5 of the sawtooth generator 2 which is applied to a second input 21. The output 22 of the comparison circuit 20 is connected to a pulse generator 23, which generates a line synchronizing pulse as soon as the amplitude of the sawtooth voltage 5 is equal to the amplitude of the voltage at the input 19 of the comparison circuit 20. As long as the scanning head moves along a track of the record carrier the leading edges of these pulses coincide with the leading edges of the line synchronizing pulses 6 of the record carrier, since the latter pulses together with the sawtooth voltage 5 determine the phase comparison voltage, which through the switch 16 is again compared with the same sawtooth voltage 5 in the comparison circuit 20, the frequency of the sawtooth voltage 5 being maintained equal to that of the line synchronizing pulses 6 of the record carrier. During the track change no pulses 6 appear and the switch 16 is changed over to the output of the clamping circuit 12 in which the phase comparison voltage as it is at the beginning of the track is clamped so that depending upon the elongation of the record carrier and hence depending upon the difference in the phase comparison voltage the amplitude of the sawtooth voltage 5 will become equal to the phase comparison voltage, which is a direct voltage, and at an instant which is earlier or later by an amount corresponding to the sudden phase shift $\phi_1$ at the beginning of the track, and hence the phase of the pulses 24 from the pulse generator 23 is also changed by an equal amount so that the sudden phase shift $\phi_1$ at the beginning of the new track is at least substantially equal to zero.

Figure 2:
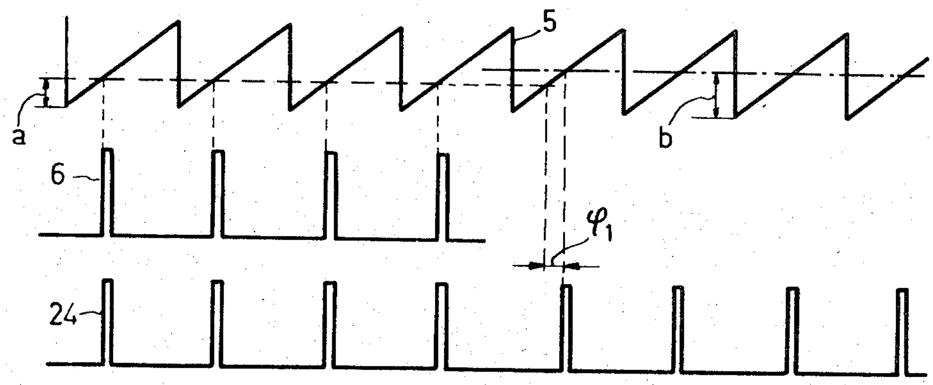
FIG. 2 shows the variation of the various voltages as a function of time.

This is illustrated in greater detail in FIG. 2, which shows the sawtooth voltage 5, the line synchronizing pulses 6 of the record carrier, the phase comparison voltages *a* and *b* at the input 19 of the comparison circuit 20 in the two positions of the switch 16, and line synchronizing pulses 24 produced in the pulse generator 23 by means thereof.

Figure 3:
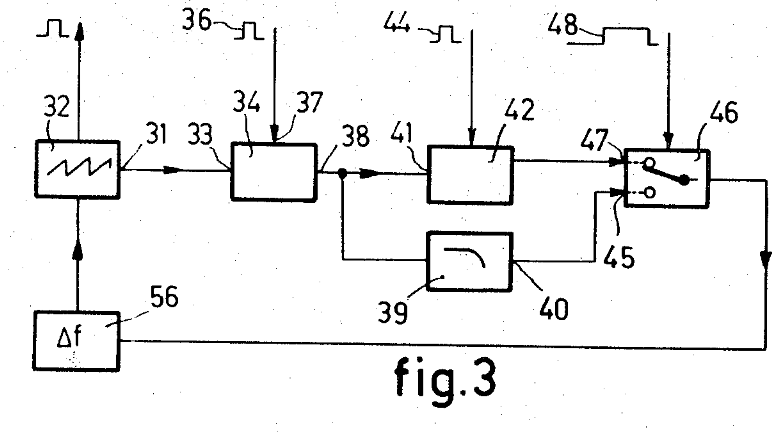
FIG. 3 is a block schematic diagram of a circuit by means of which the frequency of the line oscillator is temporarily changed.

In FIG. 3, an output 31 of a line oscillator 32 of the display circuit, which oscillator is used as an auxiliary oscillator, is connected to a first input 33 of a phase comparison circuit 34 to which are also applied through a second input 37 line synchronizing pulses 36 from the record carrier. The phase comparison pulses produced at an output 38 of the phase comparison circuit 34 are applied on the one hand to a filter 39, in which the phase comparison pulses are converted into a direct voltage which through an output 40 is applied to a first input 45 of a switch 46 which during the scanning of a track connects this input to an output connected to a tuning member 56 connected to the sawtooth oscillator 32, and on the other hand to a first input 41 of a clamping circuit 42 to a second input of which is applied the first line synchronizing pulse at the beginning of a track. In this clamping circuit 42, the sudden phase shift which is produced at the beginning of a track between the line synchronizing pulses from the sawtooth oscillator 32 and the line synchronizing pulse 44 occurring at the beginning of a track is measured and clamped. The output voltage of the clamping circuit 42 is applied to a second input 47 of the switch 46, which during the track change is changed over to the input 47 by a pulse 48, so that the output voltage of the clamping circuit 42 is applied to the tuning member 56, which during the track change varies the frequency of the sawtooth oscillator 32, in a manner such that the sudden phase shift which occurs at the end of this track change is at least substantially equal to zero.

When the pulses 36 are produced by a device which has already introduced into the train of line sychronizing pulses 36 pulses substituted for the pulses which otherwise would be missing during the track change, it is desirable for these pulses 36 not to be transmitted to the filter 39 during the track change in order to ensure that at the end of the track change the phase comparison direct voltage still is the same as it was before the track change. The pulse 48 may obviously be used for this purpose also.

Both the pulse 18 shown in FIG. 1 and the pulse 48 shown in FIG.2 may be derived from the frame flyback pulse of the receiver or from a pulse provided in a magnetic track which is provided on the shaft of a disc connected to the scanning head.

What is claimed is:

1. In a video system, and apparatus compensating for loss of synchronization during track changes, comprising a tape shaped record carrier having video signals and synchronization pulses recorded thereon in transverse tracks, said carrier being helically wound about a drum, said drum including a slot and at least one playback member rotating in said slot at right angles to the axis of said drum, said member scanning said carrier and transducing said video signals and line synchronizing pulses continuously except during track changes, a voltage controllable frequency generator, a phase comparison circuit, said phase comparison circuit receiving said line synchronization pulses and signals from said frequency generator, said phase comparison circuit generating a phase comparison voltage output, said phase comparison voltage output being coupled to said frequency generator to render generation frequency equal to frequency of said line synchronization pulse, first means responsive to each first line synchronization pulse of successive tracks and coupled to the output of said phase comparator for clamping said voltage output to a clamped signal level for each successive line synchronizing pulse received thereby, second means responsive to said track changes for decoupling from said phase comparison circuit to said first means during said track changes, and third means coupled to the frequency generator and said second means for deriving continuous compensated line synchronization pulses at a rate determined by said frequency generator.

2. The combination of claim 1, wherein said third means includes a comparator having a first input coupled to an output of said frequency generator and a second input coupled to said second means, said second means supplying said phase comparison output signal to said comparator during scan of a track, and said changed signal level to said comparator between track scans, the output of said comparator being coupled to a pulse generator, said pulse generator responsive to said comparator for generating said compensated line synchronization pulses.

3. The combination of claim 1, wherein said second means is a switch, said switch having a first position for coupling said phase comparison output signal to said third means, and a second position for applying said clamped signal level to said third means, said second means switching from said first to said second position during an interval between track scans.

4. Apparatus compensating for missing line sunchronization pulses due to track changes in a video system comprising a phase comparison circuit having a first input receiving line synchronization pulses, a second input coupled to an oscillator, and an output corresponding to a voltage level indicative of said line pulse, clamping means responsive to said output voltage level and each first line synchronization pulse of successive tracks for storing said voltage level for the duration between beginning and end of said track change, means coupled to said oscillator for deriving compensated line synchronized pulses at said oscillator frequency in response to a signal applied thereto, means coupled to said deriving means responsive to an interval between track changes for applying said clamped voltage level to said deriving means, and alternately applying said output voltage level to said deriving means during scan intervals.

* * * * *